United States Patent [19]

Barnett

[11] Patent Number: 5,683,321

[45] Date of Patent: Nov. 4, 1997

[54] DRIVE APPARATUS FOR CONVERTING LINEAR MOTION TO ROTARY MOTION

[75] Inventor: Franklin Earl Barnett, Aurora, Colo.

[73] Assignees: Franklin E. Barnett, Aurora; Brian D. Smith, Highlands Ranch, both of Colo.

[21] Appl. No.: 382,003

[22] PCT Filed: Aug. 3, 1993

[86] PCT No.: PCT/US93/07268

§ 371 Date: Feb. 1, 1995

§ 102(e) Date: Feb. 1, 1995

[87] PCT Pub. No.: WO94/03358

PCT Pub. Date: Feb. 17, 1994

[51] Int. Cl.$^6$ .................................................. F16H 7/00
[52] U.S. Cl. .................... 474/149; 474/150; 280/250; 280/250.1; 280/255
[58] Field of Search .......................... 474/148, 149, 474/150; 280/250, 250.1, 255

[56] References Cited

U.S. PATENT DOCUMENTS

| | | |
|---|---|---|
| 494,839 | 4/1893 | Berry . |
| 1,273,693 | 7/1918 | Tucker . |
| 3,191,953 | 6/1965 | Aysta .................. 280/250.1 X |
| 3,309,110 | 3/1967 | Bulmer .................. 280/242 |
| 3,629,880 | 12/1971 | Van Rhyn .................. 280/250 X |
| 3,666,292 | 5/1972 | Bartos .................. 280/234 |
| 3,877,725 | 4/1975 | Barrozza .................. 280/242 WC |
| 3,891,235 | 6/1975 | Shelly .................. 280/252 |
| 3,937,519 | 2/1976 | Schoolden .................. 280/250.1 X |
| 3,994,509 | 11/1976 | Shaeffer .................. 280/242 WC |
| 4,044,850 | 8/1977 | Winsor .................. 280/250.1 X |
| 4,063,747 | 12/1977 | Young .................. 280/255 |
| 4,274,651 | 6/1981 | Dumont .................. 280/242 WC |
| 4,453,729 | 6/1984 | Lucken .................. 280/242 WC |
| 4,652,026 | 3/1987 | Byrge .................. 280/242 WC |
| 4,762,332 | 8/1988 | Seol .................. 280/242 WC |
| 4,811,964 | 3/1989 | Horn .................. 280/255 X |
| 4,865,344 | 9/1989 | Romero, Sr. et al. .................. 280/242 |
| 4,928,986 | 5/1990 | Carpenter .................. 280/234 |
| 5,007,655 | 4/1991 | Hanna .................. 280/250.1 |
| 5,236,398 | 8/1993 | Barnett .................. 474/149 |

FOREIGN PATENT DOCUMENTS

| | | |
|---|---|---|
| 1203272 | 7/1959 | France . |
| 4015491 | 11/1991 | Germany . |
| 662320 | 9/1987 | Switzerland . |

Primary Examiner—Roger J. Schoeppel
Attorney, Agent, or Firm—Brian D. Smith

[57] ABSTRACT

A drive apparatus and method for continuously transmitting power to an axle, shaft and the like are disclosed. The drive apparatus includes a flexible ratch (414) such as flexible chain, belt or cable and cooperating first and second ratch engaging energy transmitting members (434) for releasably engaging the flexible ratch (414) to continuously drive an axle (410), shaft or the like. To operate the apparatus, the first and second enerergy transmitting ratch engaging members (434) are moved in a direction parallel to the linear paths of the flexible ratch means (414) which causes the first ratch engaging member (434) to engage and drive the flexible ratch (414) which rotatingly drives the axle (410). The ratch engaging members (434) direction of movement is then reversed so that the first ratch engaging means (434) releases the flexible ratch means (414) as the second ratch engaging means (434) engages the flexible ratch means (414) to continuously drive the axle, shaft or the like (410).

12 Claims, 10 Drawing Sheets

Fig_10

Fig_11

Fig_12

Fig_13

Fig_14

Fig_15

Fig_16

Fig_17

Fig_25

Fig_26

DRIVE APPARATUS FOR CONVERTING LINEAR MOTION TO ROTARY MOTION

TECHNICAL FIELD

The invention relates generally to method and apparatus for driving axles driven by chains, belts, cables and the like and, more specifically, to a method and apparatus for driving wheelchairs, bicycles and motor vehicles powered by internal combustion engines.

BACKGROUND OF THE INVENTION

The prior art is replete with apparatus for driving wheel chairs and bicycles. Examples of such apparatus are disclosed in U.S. Pat. Nos. 4,865,344; 4,762,332; 4,652,026; 4,453,729; 4,274,651; 4,063,747; 3,994,509; 3,877,725; 3,666,292; 3,309,110; 1,273,693 and 494,839.

A review of the above patents reveals that none of the apparatus disclosed therein is capable of receiving or transmitting linearly generated power, i.e. power which is generated by power strokes traveling along a straight line or path. All apparatus disclosed in the patents require that the operator move a handle or pedal through some sort of an arcuate or curved path in order to make a power stroke with a device. For example, in U.S. Pat. No. 3,877,725 to Barroza, it can be seen in FIG. 4 that the wheelchair is driven by moving handle 3 through the arcuate path illustrated by the arrows in FIG. 4. Similarly, in U.S. Pat. No. 4,063,747 to Young, it can be seen in FIG. 1 that the bicycle disclosed therein is powered by moving pedals 36 through an arcuate path. It will also be appreciated that the pedal of a conventional bicycle also follows an arcuate path as it revolves about the axis of the bicycle's main sprocket.

One problem with generating power along a curved or arcuate path is that the portion of the path over which maximum power can be generated is very short. For example, in a conventional bicycle, maximum power is generated during that portion of the pedal's path which travels from about +45° from the horizontal to about −30° from the horizontal. As can be visualized, it is difficult to generate significant power outside this portion of the pedal's path since the operator's foot is simply not at an angle with respect to the pedal which enables the generation of much power. The connecting rod/crankshaft attached to the piston of an internal combustion engine suffers from the same problem since the mechanics of the combination are no different than that provided by the bicyclist leg/pedal combination.

DISCLOSURE OF THE INVENTION

The present invention addresses the aforementioned problems by providing method and apparatus for continuously transmitting linearly generated power to an axle and the like to rotatingly drive the axle. The invention theoretically maximizes the amount of power that can be generated by an individual with an arm or leg since power generation theoretically can be maximized if the arm or leg moves linearly, i.e. along a straight line during a stroke of the arm or leg for generating power. As such, the power transmitting or drive apparatus of the present invention is ideally suited for use with apparatus that are powered by an individual with his arms or legs. Some examples of suitable apparatus are bicycles and wheelchairs.

It has also been determined that the drive apparatus and method of the present invention more efficiently transmits the power of a linear piston stroke to rotary motion and, as such, is ideally suited for use in an internal combustion engine.

In its broadest sense, the power transmitting or drive apparatus of the present invention includes flexible ratch means such as flexible chain, belt or cable and cooperating first and second power receiving ratch engaging members for releasably engaging the flexible ratch means to continuously drive a sprocket/pulley-type member which, in turn, continuously drives, i.e. rotates an axle or shaft which is axially aligned and connected to the sprocket/pulley type member. The axle could be the axle or driveshaft of a wheelchair, bicycle or motor vehicle and the like which, when driven, would propel the wheelchair, bicycle or motor vehicle.

In a preferred embodiment of the invention handle/pedal means, i.e. handles or pedals are also provided which are attached to the cooperating first and second ratch engaging members. This enables the apparatus to be powered by an individual with his arms or legs. Another preferred embodiment of the invention utilizes the stroke of a unique dual-headed piston which is attached to the cooperating first and second power receiving ratch engaging members to drive the driveshaft of a motor vehicle. This embodiment of the invention can also be used in reverse as a pump wherein the shaft of axle could be the shaft of an electric motor which drives the drive apparatus in the opposite direction thereby converting rotary motion to linear motion. This reverse operation of the drive apparatus would drive the dual-headed piston in a reciprocating manner in its cylindrical chamber and, as such, can be used to pump fluid through the cylindrical chamber.

The method of the present invention provides continuous driving of an axle or shaft which may be that of a bicycle, wheelchair, motor vehicle or any other similar device. The method includes the steps of providing a drive apparatus as described above. The method further includes the step of moving or powering the first and second ratch engaging power receiving members of the above-described apparatus in a direction parallel to the direction in which the flexible ratch is capable of moving so that the first ratch engaging member engages and drives the flexible ratch which rotates the sprocket/pulley-type member which, in turn, drives the axle. The method further includes a step of reversing the first and second ratch engaging members' direction of movement so that the first ratch engaging member releases the flexible ratch and the second ratch engaging member engages the flexible ratch. This releasing and engagement of the flexible ratch occurs simultaneously so that rotation of the sprocket/pulley-type member continues uninterrupted, thereby continuously driving the axle or shaft.

BRIEF DESCRIPTION OF DRAWINGS

The invention will be more readily understood by reference to the accompanying drawings wherein like reference numerals indicate like elements throughout the drawing figures, and in which.

DETAILED DESCRIPTION OF PREFERRED EMBODIMENTS

FIGS. 1 through 6 illustrate an apparatus of the present invention for driving a wheelchair 10 having a pair of propulsion wheels 12 which are attached to the frame of wheelchair 10. The apparatus includes a first drive sprocket 14 for driving the propulsion wheel which is attached to and axially aligned therewith by an axle 16. It will be appreciated that another drive apparatus (not illustrated) is located on the other side of the wheelchair which is identical to the illustrated drive apparatus.

Figures 1, 2, 6:
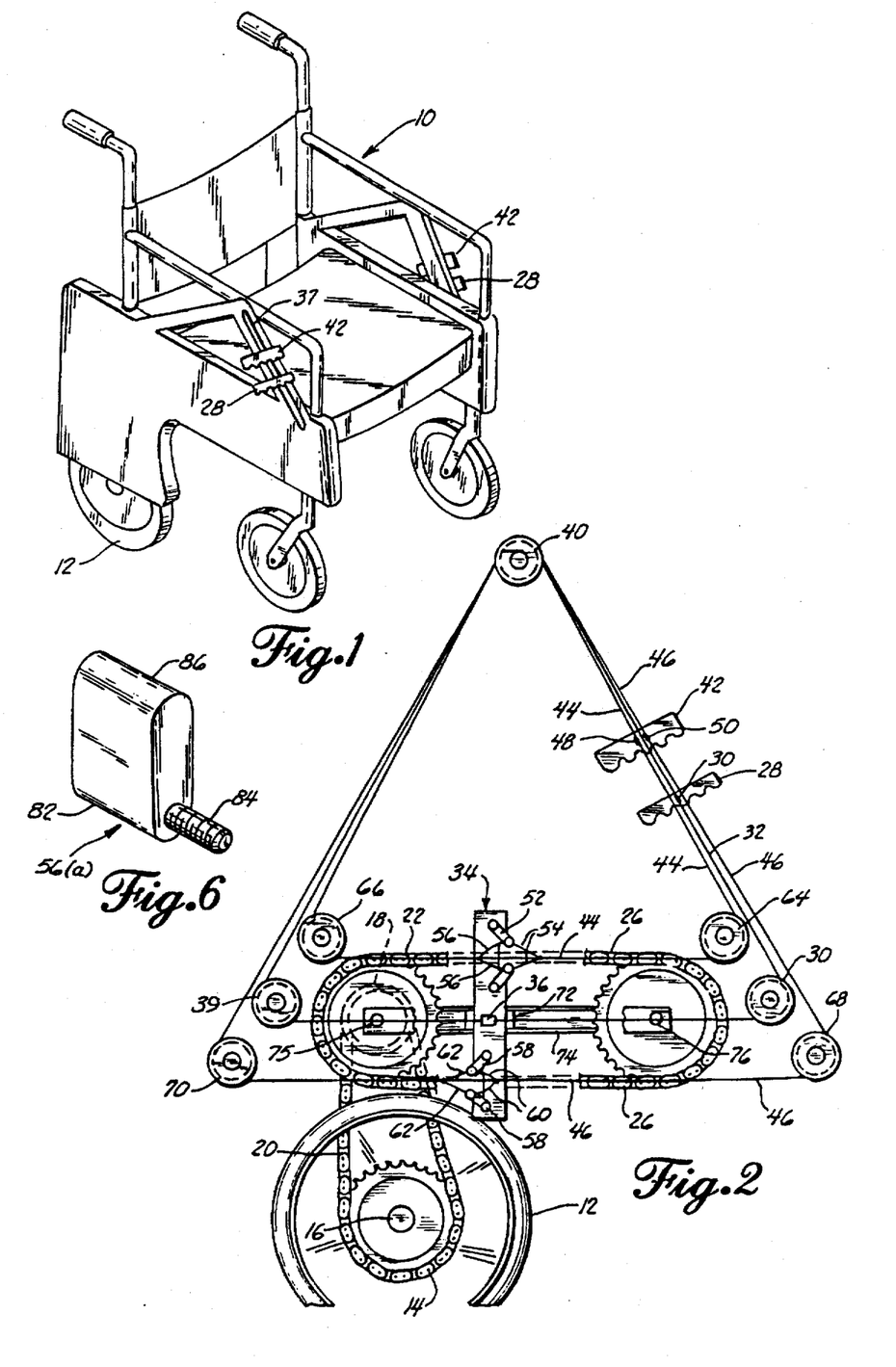
FIG. 1 is a perspective view of a wheelchair equipped with a drive apparatus of the present invention.
FIG. 2 is side elevation view of the drive apparatus for the wheelchair illustrated in FIG. 1.
FIG. 6 is a perspective view of a chain engaging member illustrated in FIGS. 2 through 5.

The drive apparatus of the present invention also includes a second drive sprocket 18 and a first drive chain 20 which is slung about the pair of first and second drive sprockets 14, 18.

The drive apparatus further includes a third drive sprocket 22 which is axially aligned and rigidly attached to second drive sprocket 18. A fourth drive sprocket 24 is also provided as well as a second drive chain 26 which is slung about the pair of third and fourth drives sprockets 22, 24.

The apparatus further includes a first handle 28 which is rigidly attached at point 30 to an endless cable 32 (slung about three pulleys 38, 39, and 40) which is in turn connected to a chain engaging means 34 at point 36. Chain engaging means 34 releasably engages chain 26 as a wheelchair occupant makes upward and downward strokes with handle 28 along a guide path 37 to continuously drive chain 26 in a clockwise direction (as viewed from FIG. 2) which, in turn, continuously drives chain 20 to propel the wheelchair in a forward direction. (i.e. when the wheelchair occupant makes similar upward and downward strokes with the handle 28 of the other drive apparatus located on the other side of the wheelchair). The details of chain engaging means 34 releasable engagement of chain 26 which drives the chain continuously in one direction is described in more detail below.

FIG. 2 also illustrates that the drive apparatus of the present invention is provided with another handle 42 which is rigidly attached to a pair of endless cables 44 and 46 at points 48 and 50, respectively. Cable 44 is attached to a pair of first and second chain engaging members 52 via a right pair of cable segments 54 and a left pair of cable segments 56. Similarly, cable 46 is connected to another pair of chain engaging members 58 via a right pair of cable segments 60 and a left pair of cable segments 62. By attaching handle 42 to chain engaging means 34 in this fashion, chain 26 can be driven in the opposite direction which propels the wheelchair in reverse when the wheelchair occupant makes upward and downward strokes with handles 42. The details of how this is accomplished by the apparatus is described in detail below.

As with cable 32, cable 44 is also slung about three pulleys 64, 66 and previously mentioned pulley 40. Pulley 40 is provided with a separate groove (not shown) for guiding cable 44. Similarly, cable 46 is slung about three pulleys 68, 70 and pulley 40 which is provided with yet another groove (not shown) for guiding cable 46.

FIG. 2 also illustrates that the drive apparatus of the present invention includes a ball bearing track slider or sliding means 72 which is slidably received in a track 74. Track 74 is mounted about the axles 75,76 for sprockets 18 and 24. Track slider 72 is rigidly attached to the central area of the underside surface of chain engaging means 34. As such, it will be appreciated that chain engaging means 34 can only move in a linear direction back and forth between the axles of sprockets 18 and 24. This keeps chain engaging means 34 aligned with drive chain 26 which is slung about sprockets 18 and 24.

Figures 3, 4, 5:
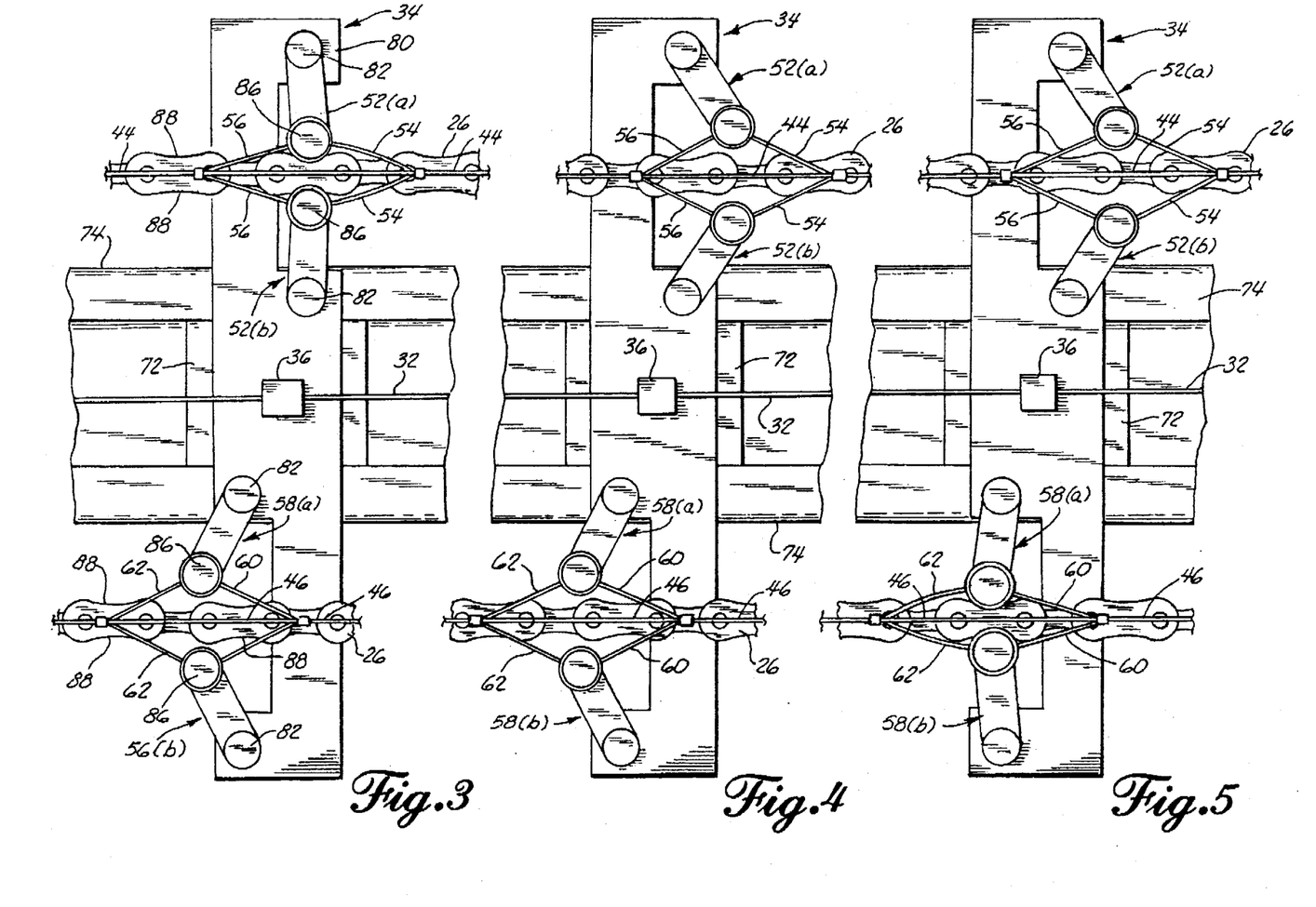
FIG. 3 is an enlarged side elevational view of the chain engaging means of FIG. 2 which illustrates the chain engaging members' position when wheelchair occupant is making an upstroke with the wheelchair's forward handles.
FIG. 4 is in enlarged side elevation view similar to that illustrated in FIG. 3 showing, however, the chain engaging members in their neutral position where they are disengaged from the drive chain.
FIG. 5 is a side elevation view similar to FIG. 3 showing, however, the chain engaging members in the position they assume when the wheelchair occupant makes a downstroke with the wheelchair's forward handle.

FIG. 3 illustrates the details of chain engaging means 34 for driving chain 26. As illustrated, chain engaging means 34 has a base 80 upon which are mounted pivoting chain engaging members 52(a),(b) and 58(a), (b). FIG. 6 illustrates a perspective view of chain engaging member 52(a) which is identical to chain engaging members 52(b) and 58(a) and (b). As illustrated, each chain engaging member has an end 82 for housing a bolt 84 which extends therethrough and which is used to pivotally attach each chain engaging member to base 80. Each chain engaging member also has a free end 86 for swinging into engagement with the concave edges 88 of chain 26. It will be appreciated that when the free ends 86 of a chain engaging member are engaging a link of chain 26, chain 26 can be driven in either a forward or reversed direction. The direction of travel will depend upon which handle the wheelchair occupant is grasping to make downstrokes and upstrokes with. As previously mentioned, upstrokes and downstrokes made with handles 28 propel the wheelchair in a forward direction while such made with handles 42 propel the wheelchair in reverse.

FIG. 3 illustrates the position which chain engaging members 52 and 58 are in when the wheelchair occupant makes an upstroke along guide path 37. As can be visualized, when making an upstroke with handle 28, cable 32 attached to handle 28 pulls base 80 to the right. When this happens, the inertia of cables 44 and 46 (which are rigidly attached to the free ends 86 of the chain engaging members 52, 58 via cable segments 54, 56, 60 and 62) causes the free ends 86 of chain engaging members 52(a) and (b) to simultaneously engage a link of chain 26, i.e. engage the concave edges 88 of a chain link of chain 26. While this is happening, the inertia of cable 46 causes the free ends 86 of chain engaging members 58(a) and (b) to swing out of engagement with chain 26. Thus, it will be appreciated that with only the upper set of chain engaging members 52 (a) and (b) engaging chain 26, chain 26 is driven in a clockwise direction, which in turn propels the wheelchair forward (i.e., if a similar stroke is made with the other handle 28).

When the wheelchair occupant finishes making upstrokes with handles 28 and begins making downstrokes therewith, the chain engaging members pivot from their positions illustrated in FIG. 3 to their positions illustrated in FIG. 5. This pivoting occurs because base 80 is now moving to the left which causes the inertia of cable 44 to swing the free ends 86 of chain engaging members 52(a) and (b) out of engagement with chain 26. As this is happening, the inertia of cable 46 causes the free ends 86 of chain engaging members 58(a) and (b) to swing into engagement with chain 26. As such, those skilled in the art will appreciate that the movement or driving of chain 26 continues in the clockwise direction, thereby continuing the wheelchair's propulsion in the forward direction.

The path traveled by the inertial forces generated by cables 44 and 46 is somewhat difficult to explain, but is believed to be as follows. When making an upstroke with handle 28, the inertia of cable 44 is transmitted to free ends 86 of chain engaging members 58(a) and (b) via cable segments 56. Similarly, the inertia of cable 46 is transmitted to the free ends 86 of chain engaging members 58(a) and (b) via cable segments 62. When making a downstroke with handle 28, the inertial forces generated by cable 44 are transmitted to free ends 86 of chain engaging means 52(a) and (b) via cable segments 54. Similarly, the inertial forces generated by cable 46 are transmitted to the free ends 86 of chain engaging members 58(a) and (b) via cable segments 60.

It is also important that the cable segments of each pair have the same length. This insures that the chain engaging members to which the cable segments are attached pivot simultaneously to simultaneously engage the oppositely facing concave edges 88 of a single chain link. Such simultaneous engagement of a chain link by a pair of chain engaging members is necessary in accordance with the present invention for effective driving (and grabbing if you will) of the chain.

FIG. 4 illustrates chain engaging members 52(a) and (b) and 58(a) and (b) in a neutral position wherein neither set of chain engaging members 52, 58 is engaging chain 26. The chain engaging members pivot into this position when the wheelchair occupant lets go of handles 28, 42 (or at least stops making upstrokes with either pair of handles) and when the wheelchair moves forward, i.e., is either pushed or is coasting.

The chain engaging members pivot into neutral when the aforementioned happens because the inertia of chain 26 pushes the chain engaging members out of engagement with the chain. This is to be contrasted with the inertia of cables 44 and 46 which causes the free ends to move into engagement with chain 26 when downstrokes and upstrokes are made with handles 28 to propel the wheelchair forward.

The chain engaging members will remain in neutral (i.e., once put into neutral) until the wheelchair occupant begins making either an upstroke or downstroke with handles 28, 42. Once in neutral, the wheelchair can be pushed, or, if desired, it can coast in either a forward or a reverse direction.

If the wheelchair were to accidentally begin coasting in reverse, the wheelchair occupant can stop such movement by grabbing either pair of handles 28, 42 and beginning to make an upstroke or downstroke therewith, as previously mentioned. This will move the chain engaging members into engagement-with the chain in one of the positions illustrated in either FIGS. 3 or 5 (the particular position depending on which pair of handles is grabbed and whether an upstroke or downstroke is made therewith) and the wheelchair will stop coasting in reverse when handles 28, 42 travel to the end of path 37. The wheelchair is prevented from coasting any further in reverse since the chain engaging members stay engaged with chain 26 once they pivot into engagement therewith, even if the wheelchair occupant lets go of the handles. Those skilled in the art will appreciate that the ability to prevent reverse coasting of the wheelchair is particularly desirable since it enables the wheelchair occupant to stop the wheelchair on the hill and perform any desired task with his hands which the occupant is free to use since they do not have to be used in any manner to prevent the wheelchair from coasting downhill i.e. they do not have to be used to grab handles 28,42 or to squeeze the wheelchair's hand brakes.

The chain engaging members can also be used to stop the wheelchair from coasting downhill in a forward direction. However, the process is somewhat different. Only the reverse pair of handles can be used and to prevent the wheelchair from beginning to coast forward again, the occupant must keep the chain engaging members engaged with the chain by holding onto the reverse handles and applying enough pushing or pulling pressure to keep the chain engaging members engaged with the chain. If the wheelchair occupant were to let go of the handles, the chain engaging members would simply pivot into neutral as previously described when the wheelchair begins to coast forward. It should also be mentioned that if the wheelchair is coasting downhill at a high rate of speed, the chain engaging members will not instantly engage the chain when handles 42 are grabbed and pulled or pushed. They will, however, impact up against the chain and generate resistance to the chain's continued movement. In time, the chain will slow down and ultimately stop. This method of braking the wheelchair is not the recommended method even though it works. The preferred braking method involves equipping the wheelchair with conventional hand brakes which, when squeezed, will brake the wheelchair in the conventional manner.

FIG. 3 also illustrates the position to which chain engaging members pivot when a wheelchair occupant makes a downstroke with reverse handle 42, which drives the wheelchair in reverse. It will be appreciated, however, that it is not the inertia of cables 44, 46 which swing the chain engaging members into and out of engagement with chain 26 when reverse handles 42 are used. Instead, it is the inertia of base 80. It will be recalled that reverse handle 42 is rigidly attached to both cables 44 and 46. Accordingly, when the wheelchair occupant makes a downstroke with handle 42, cables 44 and 46 are pulled to the left, as such is viewed from the perspective of FIGS. 2–5. Thus, it will be appreciated that it is the inertia of base 80 which acts on the free ends 86 of chain engaging members 52(a) and (b) to swing them into engagement with chain 26. Similarly, it is the inertia of base 80 which causes the free ends 86 of chain engaging members 58(a) and (b) to swing out of engagement with chain 26.

The path taken by the inertial forces in swinging the chain engaging members into and out of engagement with chain 26 is as follows. When making a downstroke with reverse handle 42, the inertial forces generated by base 80 are transmitted from base 80 through chain engaging members 58(a) and (b) through the free ends 86 thereof, and then through cable segments 62 to cable 46, thereby causing chain engaging members 58(a) and (b) to swing out of engagement with chain 26. Similarly, when making downstroke with reverse handle 42, the bases's inertial forces are transmitted from base 80 through chain engaging members 52, through their free ends 86, and then through cable segments 56 which direct the free ends into engagement with chain 26.

FIG. 5 illustrates the position to which chain engaging members 52 and 58 pivot when the wheelchair occupant begins making an upstroke with reverse handle 42. It will be appreciated that when making an upstroke with handle 42, cables 44 and 46 are pulled to the right. Thus, the inertia of base 80 pulls the free ends 86 of chain engaging members 52(a) and (b) out of engagement with chain 26. The path of inertia transmission is from base 80 through chain engaging members 52(a) and (b), through their free ends 86 and then through cable segments 54 to cable 44. Another way of perhaps explaining the movement of free ends 86 out of engagement with chain 26 would be to state that the inertia of base 80 tensions chain engaging members 52(a) and (b) and cable segments 54, thereby pulling the free ends of chain engaging members 52(a) and (b) out of engagement with chain 26.

With respect to chain engaging members 58(a) and (b) when making an upstroke with reverse handle 42, it will be appreciated that again, it is the inertia of base 80 which causes the free ends 86 of chain engaging members 58 (a) and (b) to move into engagement with chain 26. The inertial forces of base 80 travel through chain engaging members 58 (a) and (b), through free ends 86 thereof and then through cable segments 60 which direct free ends 86 into engagement with chain 26.

In view of the above, it will be appreciated that while the transmission of the inertial forces may be difficult to understand, the above described apparatus enables chain 26 to be continuously driven-in a counterclockwise direction when viewed from the perspective of the drawings, which in turn enables the wheelchair to be propelled in reverse.

Figure 7:
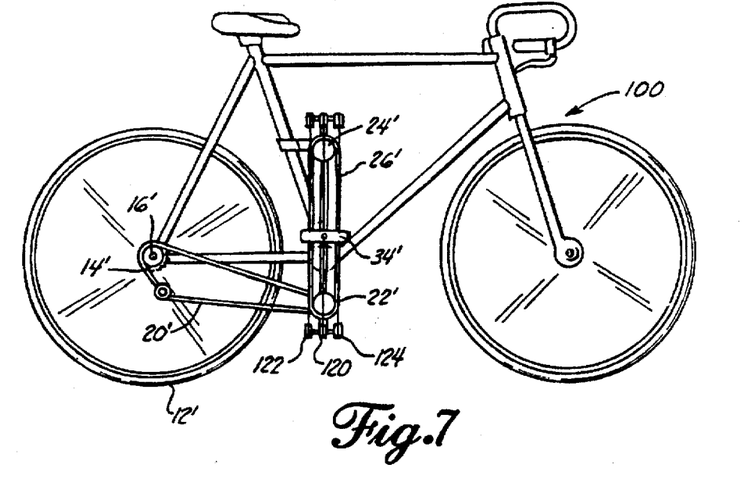
FIG. 7 is a side elevation view of a bicycle equipped with a drive apparatus of the present invention.
Figure 8:
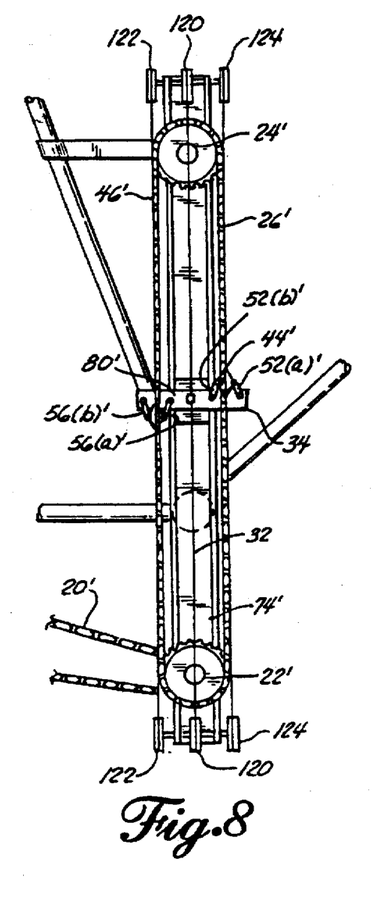
FIG. 8 is an enlarged side elevation view of the bicycle's drive apparatus FIG. 7.
Figure 9:
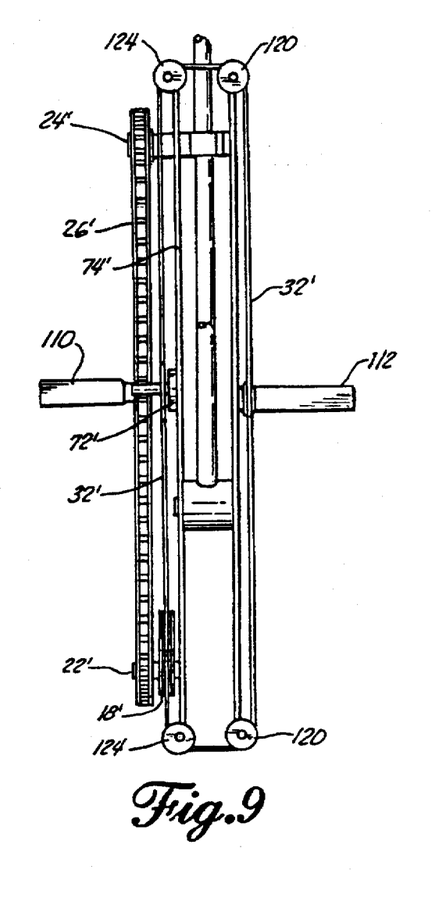
FIG. 9 is a front elevation view of the bicycle's drive apparatus taken along lines 9—9 of FIG. 7.
Figure 10:
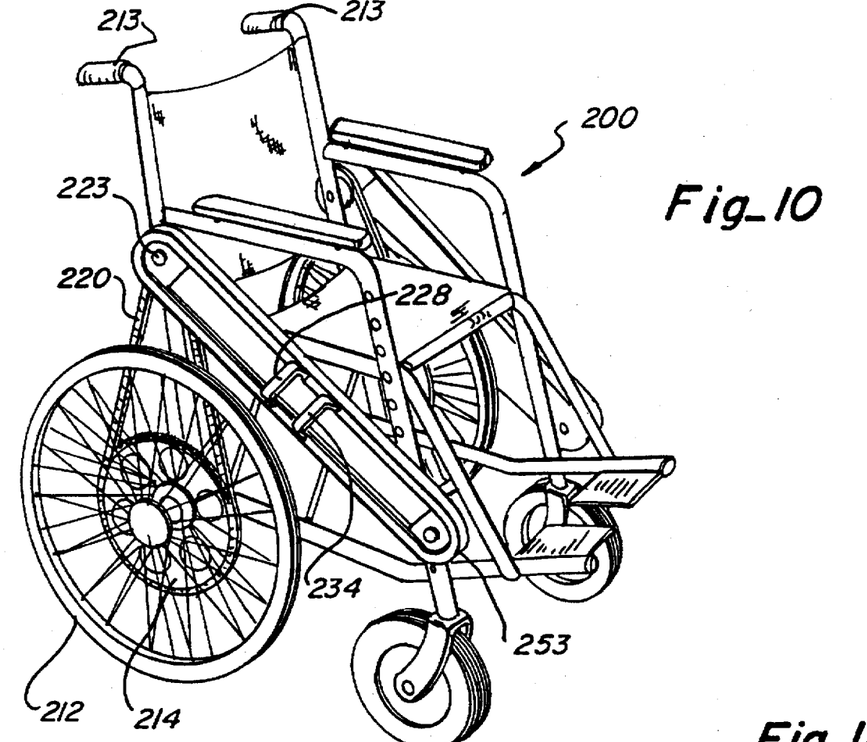
FIG. 10 is a perspective view of a second wheelchair embodiment of the present invention.

FIGS. 7 through 9 illustrates another drive apparatus of the present invention which is fundamentally the same as that illustrated for wheelchair 10. However, this drive apparatus has been adapted to drive the illustrated bicycle 100.

To make it easier for one to quickly understand the bicycle's drive apparatus, the components of the bicycle's drive apparatus which are functionally equivalent to those of the wheelchair's apparatus are numbered similarly with the exception that the numbers are primed.

The major difference between the drive apparatus of bicycle 100 and wheelchair 10 is that the bicycle's drive apparatus has no means for driving the bicycle in reverse. Reverse operation of bicycle 100 is, quite obviously, not necessary since bicycles are typically only driven in a forward direction. Accordingly, those having an understanding of the wheelchair's drive apparatus will appreciate that there are no handles or pedal means attached to cables 44' and 46' for driving bicycle 100 in the reverse direction. Nonetheless, cables 44' and 46' are very important elements of the bicycle's drive apparatus since they provide the inertia for swinging the chain engaging members into and out of engagement with drive chain 26', which occurs in a manner identical to that described for the wheelchair's drive apparatus as illustrated in FIGS. 3 through 5.

The other major difference between the drive apparatus for bicycle 100 and wheelchair 10 is that cable 32' has a pair of left and right pedals, 110 and 112, rigidly attached to it instead of the single handle 28 provided in the wheelchair's drive apparatus. Those skilled in the art will appreciate that the upstroke function provided by handle 28 in the wheelchair's drive apparatus is provided in the bicycle's drive apparatus by pedalling downwardly with pedal 112. Accordingly, it will be appreciated that chain 26' can be continuously driven by pedalling the bicycle in a conventional fashion. The only difference is that with the drive apparatus of the present invention, a bicyclist will be able to generate more power with greater efficiency since the strokes of each pedal follow a straight line i.e. a linear path. As previously alluded to, a linear stroke is advantageous since it enables the bicyclist to exert more force on a pedal during a pedaling stroke than is possible with the pedal of a conventional bicycle which travels through an arc-like path.

Other differences between the wheelchair's drive apparatus and the bicycle's drive apparatus include the following:

1. Cable 32' is slung about a set of four pulleys 120 instead of the three pulleys 38, 39 and 40 illustrated in FIG. 2. Those skilled in the art will appreciate that the set of four pulleys 120 could be replaced by a set containing only two pulleys. However, a two pulley set would have to have larger diameter pulleys.

2. Cables 44' and 46' are each slung about pulley sets having only two pulleys each, i.e. pulleys 122 and 124, as opposed to the three pulley sets illustrated in FIG. 2.

FIGS. 10 through 21 illustrate another apparatus of the present invention for driving a wheelchair 200 having a pair of propulsion wheels 212 which are attached to the frame of wheelchair 200. The apparatus (one of which is located on each side of the wheelchair) includes a first drive sprocket 214 for driving a propulsion wheel 212 which is attached to and axially aligned with sprocket 214 by an axle 216.

A second drive sprocket 218 is also provided as well as a first drive chain 220 which is slung about the pair of first and second drive sprockets 214, 218. In addition, a third drive sprocket 222 is provided which is axially aligned and rigidly attached to the second drive sprocket 218 by an axle 223 (See FIG. 13). A fourth drive sprocket 224 is also provided as well as a second drive chain 226 which is slung about the pair of third and fourth drive sprockets 222, 224.

The apparatus further includes a first handle 228 for driving chain 226 in a clockwise direction and propelling the wheelchair forward. Handle 228 is rigidly attached to a first base plate 230 by a connecting member 232 (see FIG. 16). The apparatus also includes a second handle 234 for driving chain 226 in the opposite direction (i.e. the wheelchair in reverse) which is connected to a second base plate 236 as best illustrated in FIG. 17 by a connecting member 238.

Figure 16:
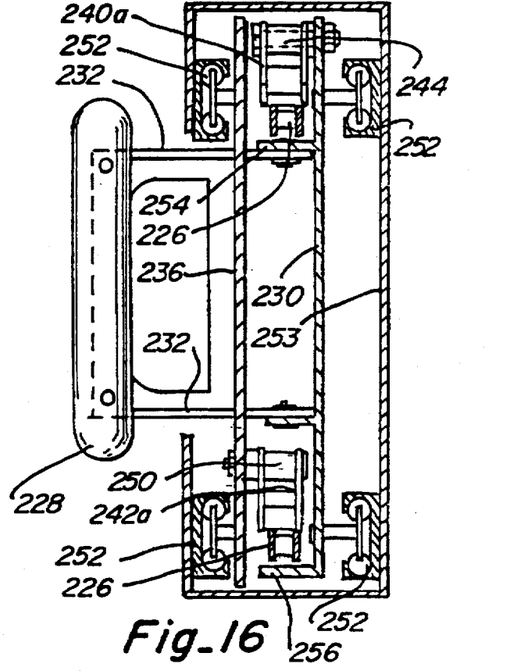
FIG. 16 is a cross-sectional view taken along lines 16—16 of FIG. 14.
Figure 17:
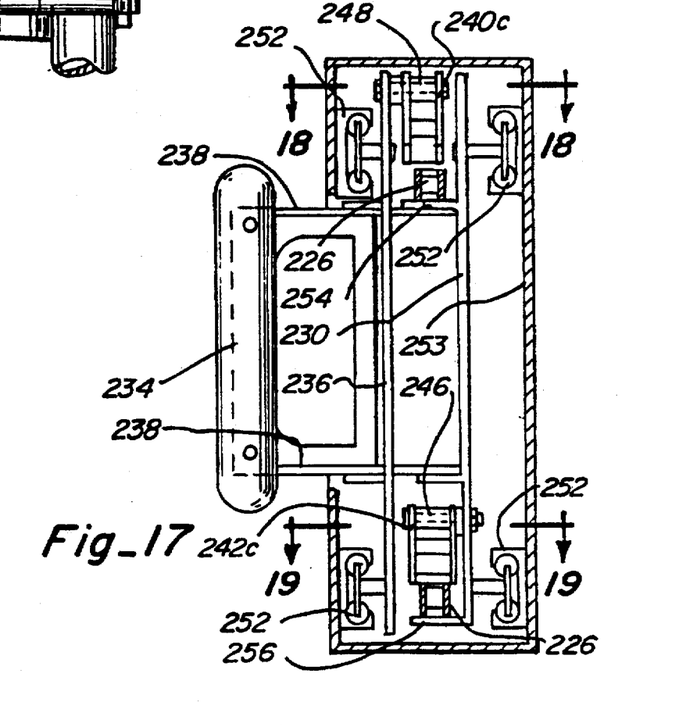
FIG. 17 is a cross-sectional view taken along lines 17—17 of FIG. 14.

The first and second base plates 230, 236 are connected together as illustrated in FIGS. 16 and 17 (see also FIG. 13) by a pair of three-link chain segments identified respectively by numerals 240 and 242. As illustrated, each link of each three link chain is identified by the letters (a), (b) and (c). It will be appreciated that first (or lower) base plate 230 is connected to the second (or upper) base plate 236 by pivotally attaching the outer ends of links 240(a) and 242(c) to lower base plate 230 with pins 244 and 246, respectively, and by pivotally attaching the outer ends of links 240(c) and 242(a) to upper second base plate 236 with pins 248 and 250 respectively. Those skilled in the art will appreciate that by connecting base plates 230 and 236 together in this manner, base plates 230 and 236 are moveable relative to each other in a direction parallel to the linear paths of travel made by drive chain 226.

It will also be appreciated from FIGS. 16 and 17 that base plates 230, 236 direction of movement is maintained in alignment with chain 226's linear paths of travel by attaching base plates 230 and 236 to ball bearing track means 252 which, in turn, are rigidly attached to a housing 253 of the apparatus which is rigidly attached to the wheelchair's frame (not numbered). As illustrated in FIGS. 16 and 17, four track means 252 are provided, two of which are attached to each base plate to control its movement so that it only moves linearly in the direction of the drive chain's linear paths of travel.

Returning now to FIG. 13, it will be appreciated that base plate 230 is provided with a pair of chain backstops 254 and 256, which prevent chain 226 from being pushed by three-link chain segments 240 and 242 when it is engaged thereby as is explained in more detail below.

Figure 13:
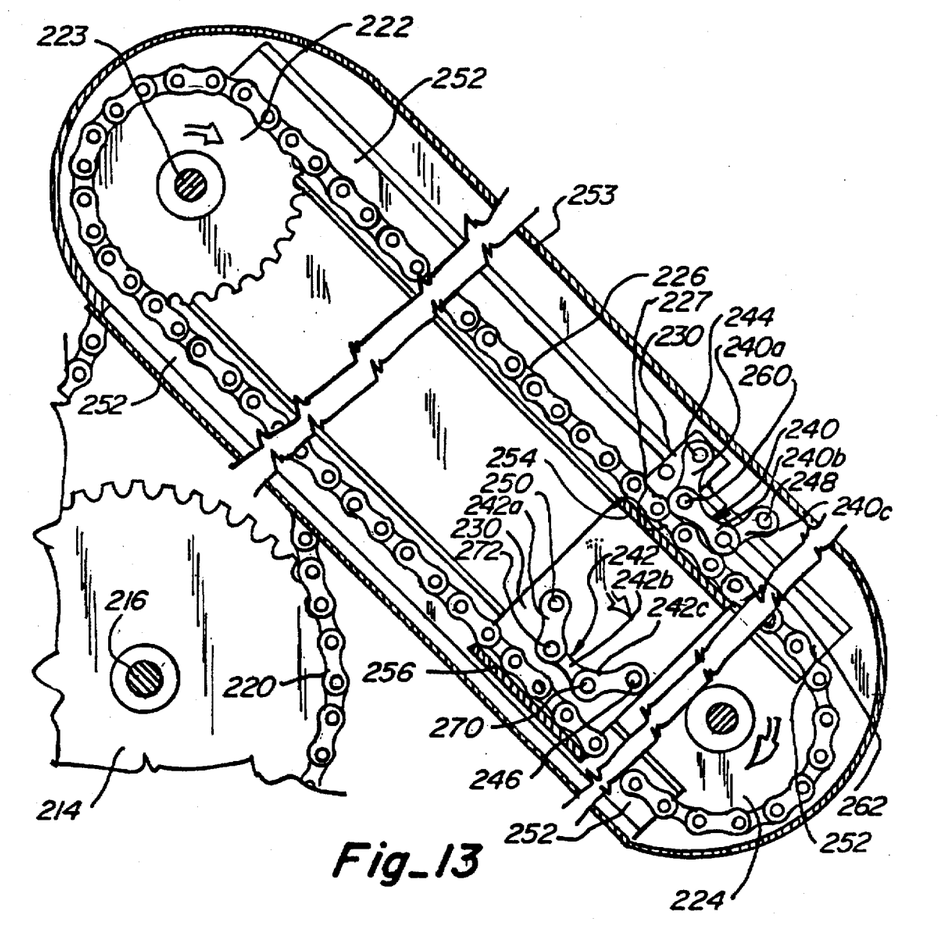
FIG. 13 is a cross-sectional view taken along lines 13—13 of FIG. 12.

The cooperation of the drive apparatus' components will now be described to explain how the wheelchair is propelled in a forward direction by making downstrokes and upstrokes with handles 228 and in a reverse direction by doing the same with handles 234. FIG. 13 illustrates the position of the drive apparatus' components when the wheelchair occupant is making a downstroke with the forward pair of handles 228. As illustrated, the pivotal connection 260 of links 240(a) and 240(b) is engaging chain 226 by pressing a link 227 of the driven chain up against backstop 254. Pivotal connection 260 is also referred to herein as the following end of center link 240(b) because it follows center link 240(b)'s other pivotal connection 262 (referred to as the leading end 262) when the chain is moving clockwise. Pivotal connection or following end 260 engages link 227 by impacting up against the concave edges of the link which, as previously mentioned, is prevented from moving inwardly by backstop 254. Thus, it will be appreciated that end 260 in essence grabs a link 227 of chain 226 to drive it in a clockwise direction as illustrated in FIG. 13. The clockwise movement of chain 226 drives sprocket 218 attached to axle 223 which in turn drives sprocket 214 and wheel 212, thereby propelling the wheelchair.

It will also be appreciated from an inspection of FIG. 13 that while end 260 is engaging link 227, three link chain segment 242 is not engaging or making contact with chain 226. Chain segment 242 is prevented from contacting the drive chain due to the inertia of handle 234 and attached base plate 236 which in essence pulls chain link segment 242 out of engagement with the chain by pulling against pin 250 in a direction opposing handle 228's direction of movement. As will be recalled, the other end of three link chain segment 242 is prevented from being similarly pulled since it is attached to the lower base plate 230 by pin 246 which is connected to forward handle 228.

Figures 18, 19, 20, 21:
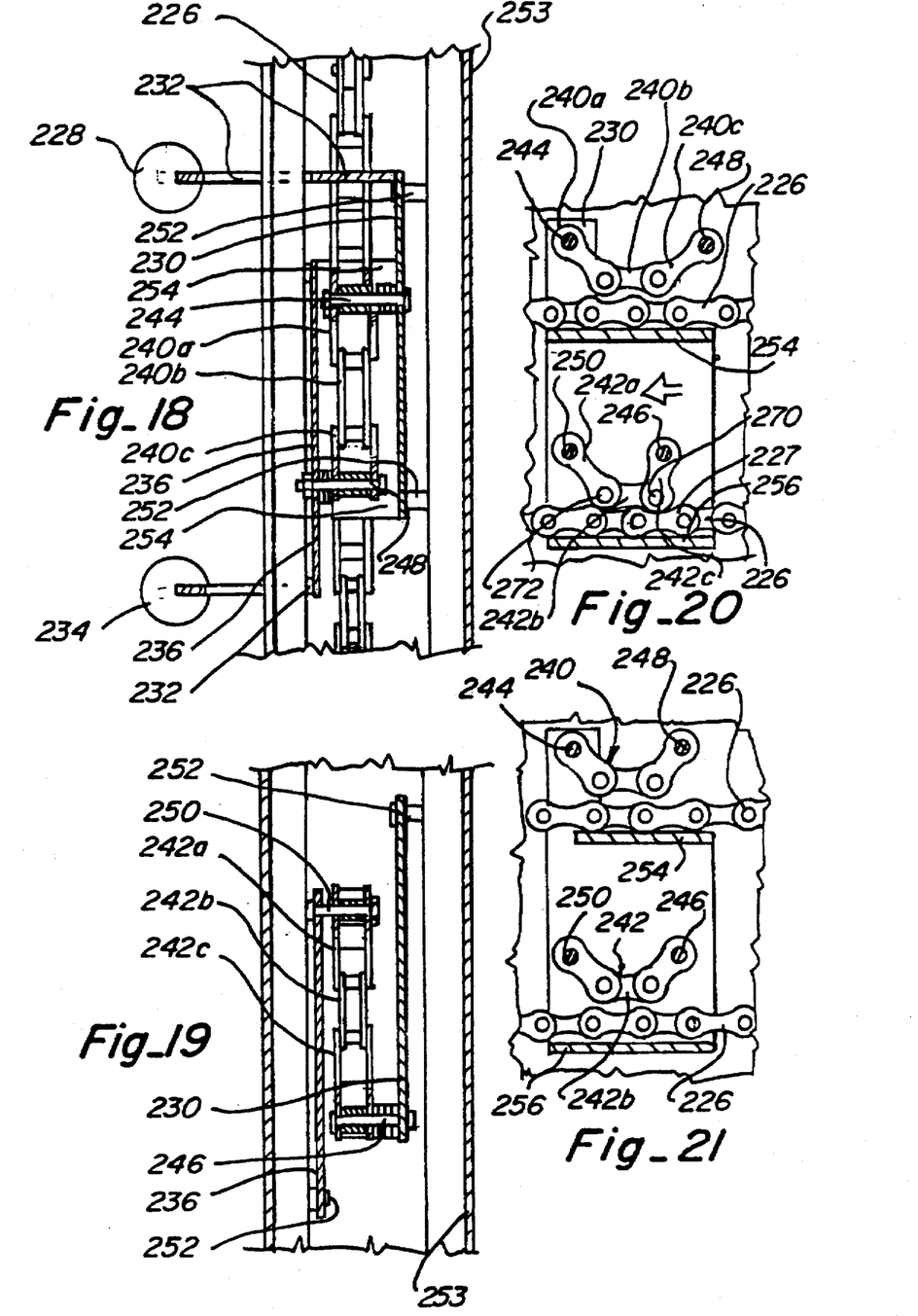
FIG. 18 is a cross-sectional view taken along lines 18—18 of FIG. 17.
FIG. 19 is a cross-sectional view taken along lines 19—19 of FIG. 17.
FIG. 20 partial cross-sectional view similar to FIG. 13 showing chain link segment 242 engaging the drive chain of the apparatus.
FIG. 21 is a partial cross-sectional view similar to FIG. 20 showing the chain link segments in their neutral position.
Figure 22:
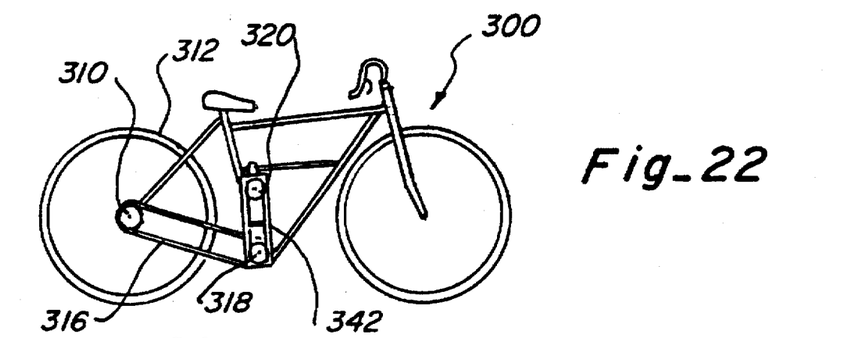
FIG. 22 is a side elevational view of a second bicycle embodiment of the present invention.

At the instant the wheelchair occupant completes a downward stroke and begins making an upstroke with handle 228, chain link segments 240 and 242 reverse positions and thereby pass through their neutral positions illustrated in FIG. 21 to their positions illustrated in FIG. 20 wherein it will be appreciated that end 270 of chain link segment 242 is engaging a link 271 of chain 226. Those skilled in the art will appreciate that it is again the inertia of upper base plate 236 connected to rear handle 234 which pushes end 270 of chain link segment 242 into engagement with a link 271 and pulls end 260 of chain segment 240 out of engagement with chain 226. This happens because the inertia of upper base plate 236 in essence pulls pin 248 in a downward direction opposing the direction of the upstroke (as indicated by the arrow in FIG. 20) thereby pulling chain link segment 240 out of engagement with chain 226, as such permitting the chain to travel in a clockwise direction between backstop 254 and chain link segment 240.

When a wheelchair occupant reaches the end of an upstroke and begins making a downstroke with handles 234, chain link segments 240 and 242 again reverse position (and thereby assume the position illustrated in FIG. 13) to continue driving chain 226 in a clockwise direction.

If the wheelchair occupant lets go of handles 228, the chain link segments will release chain 226 and assume the position illustrated in FIG. 21. In this position, the wheelchair may be pushed or propelled conventionally by grabbing rear wheels 212 or by a third party grasping handles 213 of the wheelchair.

To propel the wheelchair in reverse, the wheelchair occupant simply grabs handles 234 and begins making downstrokes and upstrokes therewith. It will be appreciated that the three-link chain engaging segments 240 and 242 now propel drive chain 226 in a counter-clockwise direction. It will further be appreciated that the operation of the chain link segments is identical to that previously described for driving the chain clockwise with the exception that lower base plate 230 and attached handle 228 now provide the inertia for moving or pulling the three-link chain segments 240 and 242 into and out of engagement with drive chain 226. It will further be appreciated that FIG. 13 illustrates the position of three-link chain segments 240 and 242 when the wheelchair occupant is making an upstroke with reverse handles 234 with the exception, however, that end 262 of center link 240(b) will engage a link 271 of drive chain 226 instead of the center link's end 960. As previously mentioned, it is always the following end which engages a link of the drive chain. Since chain 226 is now moving in the reverse, i.e. counterclockwise direction, the following end is end 262. Thus, FIG. 20 illustrates the position of three-link chain segments 240 and 242 when the wheelchair occupant is making a downstroke with reverse handles 234 with the exception, however, that end 272 of link 242(b) will engage a link 271 of drive chain 226 instead of the illustrated end 270. As will be appreciated, end 272 is the following end when chain 226 is moving in a counterclockwise direction.

As also illustrated, center links 240(b) and 242(b) have a length which is about 1½ times the length of a link 227 of drive chain 226. In accordance with an important aspect of the invention, center links 240(b) and 242(b) are provided with a length which is greater than the length of a link 227 of the drive chain so that only the following end of the center links engages a link of the drive chain. If center links 240(b) and 242(b) had the same length as a link of the drive chain, both the leading and following ends of the center link could engage and possibly stick to drive chain 226, as such possibly preventing the three-link chain segments from releasing the drive chain at the end of a stroke. By using center links which are slightly longer than those of a chain link 227 (preferably 1½ times the length), jamming or failure to release drive chain 226 should not occur.

Figure 11:
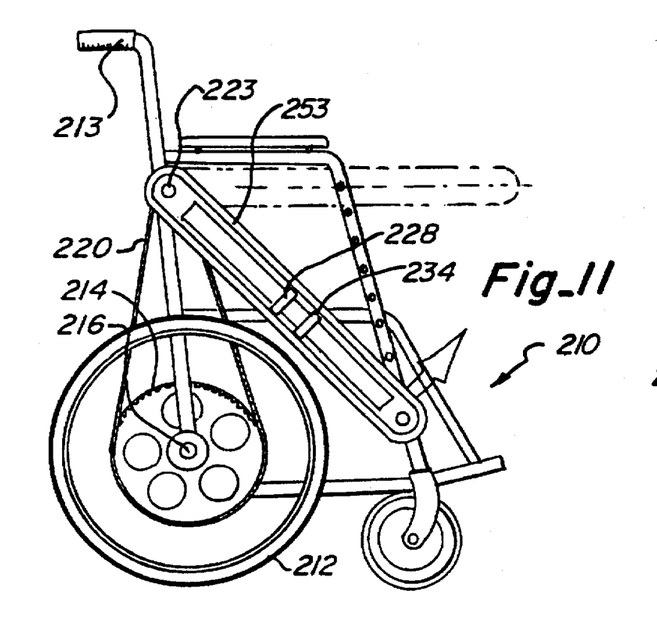
FIG. 11 is a side elevation view of the wheelchair of FIG. 10.
Figure 12:
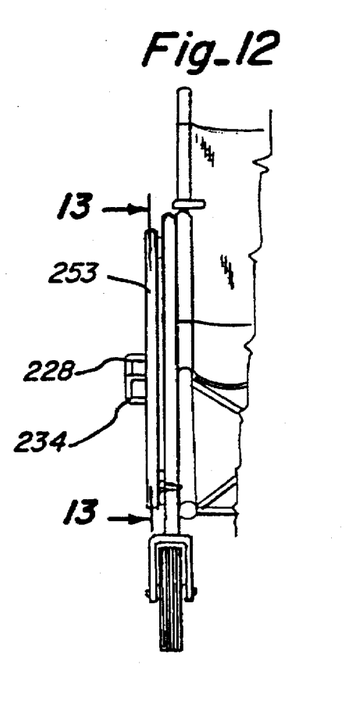
FIG. 12 is a partial front elevation view of the wheelchair of FIG. 10.
Figure 14:
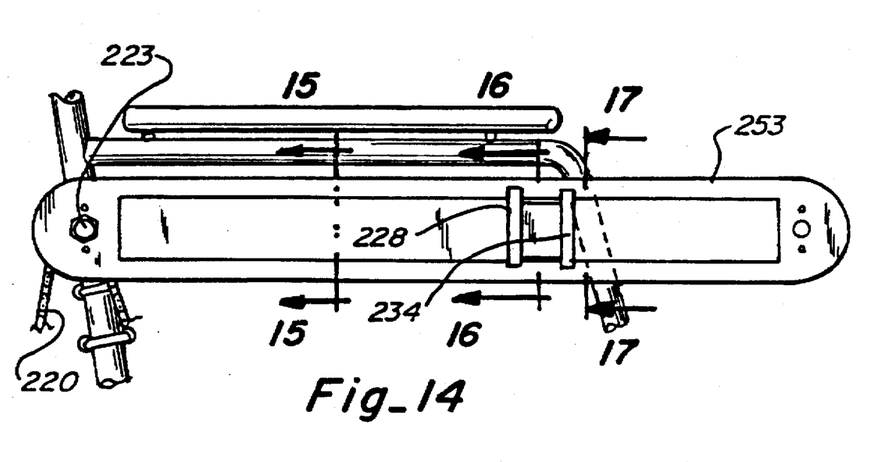
FIG. 14 is a partial side elevational view of the wheelchairs FIG. 11.
Figure 15:
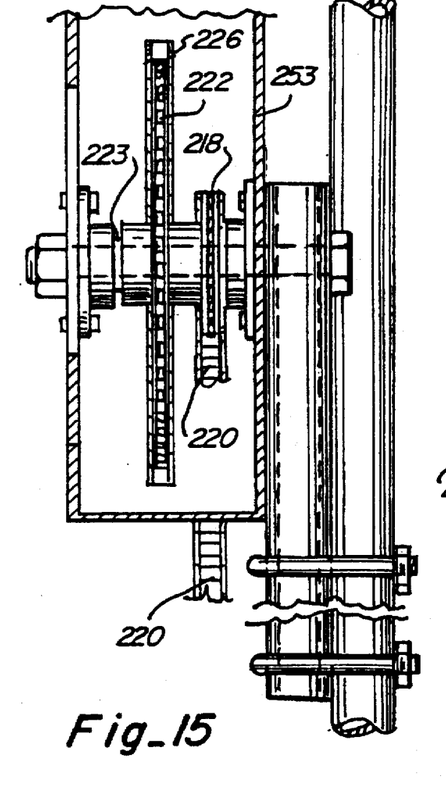
FIG. 15 is a cross-sectional view taken along lines 15—15 of FIG. 14.

As illustrated in FIG. 11, the drive apparatus of wheelchair 200 can also be pivoted upwardly about shaft 223 from about its 45° angle depicted in FIG. 11 to a horizontal position as depicted in FIG. 14 and depicted in phantom in FIG. 11. The ability to pivot the apparatus allows the wheelchair occupant to position the apparatus at a comfortable angle.

Figures 23, 24:
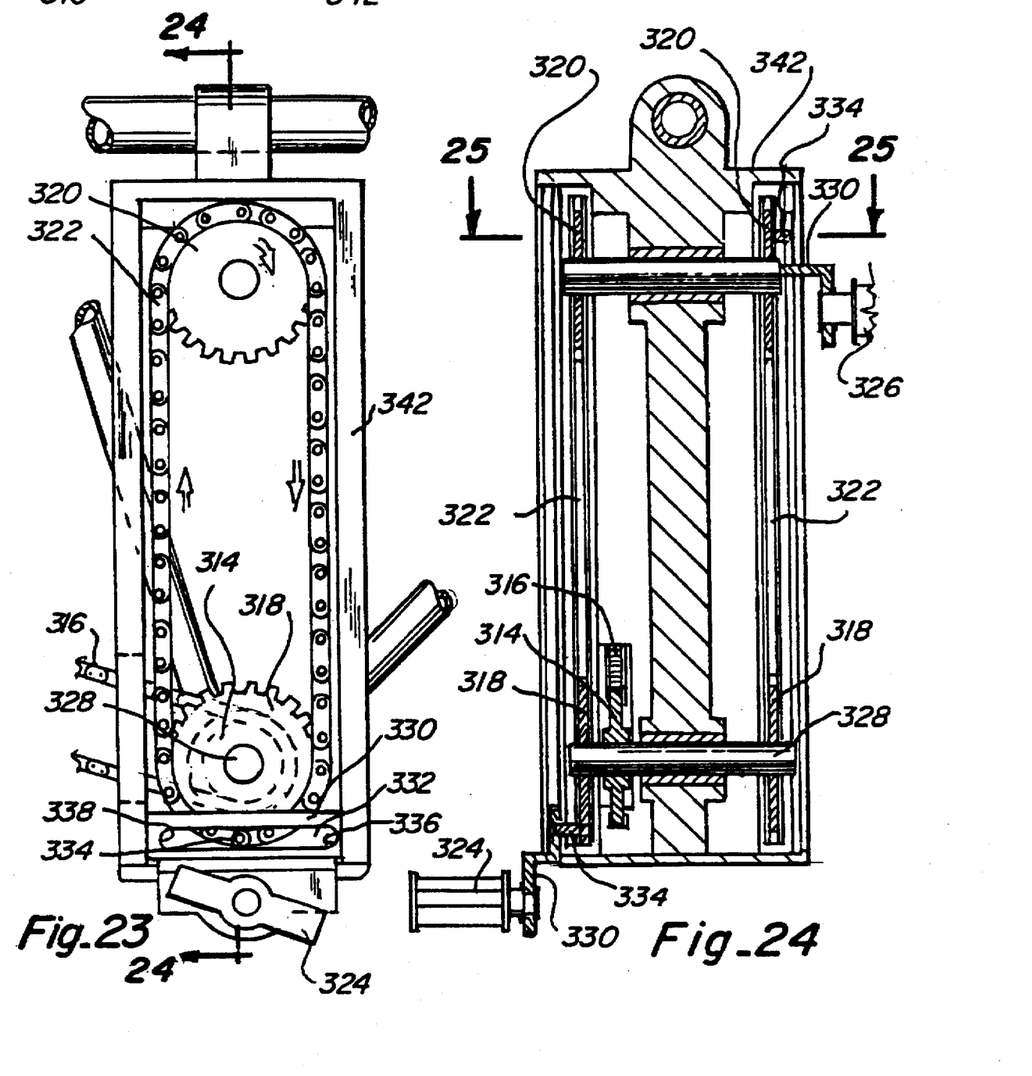
FIG. 23 is a partial side elevational view of the drive apparatus of the bicycle illustrated in FIG. 22.
FIG. 24 is a cross-sectional view taken along lines 24—24 of FIG. 23.

FIGS. 22 through 26 illustrate another drive apparatus of the present invention for driving a bicycle 300. This embodiment is similar to the previous embodiment for driving a bicycle in that this embodiment also uses a chain engaging means for releasably engaging a second drive chain to continuously drive the second drive chain as the operator pedals the bicycle which, in turn, continuously drives a first drive chain to propel the bicycle's rear wheel and thus the bicycle. As with bicycle 100, this embodiment has a first drive sprocket 310 which is attached to and axially aligned with the bicycle's propulsion wheel 312 and which drives the bicycle's propulsion wheel when it is driven. A second drive sprocket 314 is also provided as well as a first drive chain 316 which is slung about sprockets 310, 314. In addition, two drive assemblies (not numbered) are provided for being driven by a bicyclist pedalling the bicycle with its right and left pedals 324, 326, to which the drive assemblies are respectively attached. Each drive assembly includes a pair of third and fourth drive sprockets 318, 320 about which a second drive chain 322 is slung. As seen in FIG. 24, the third drive sprockets 318 of each drive assembly are axially aligned with each other and with second drive sprocket 314 by an axle 328. Sprockets 318 and sprocket 314 are also fixedly attached to axle 328 and connected to each other so that if right sprocket 318 is driven, sprocket 314 and the other, i.e. left sprocket 318 of the other drive assembly will also rotate.

Figure 25:
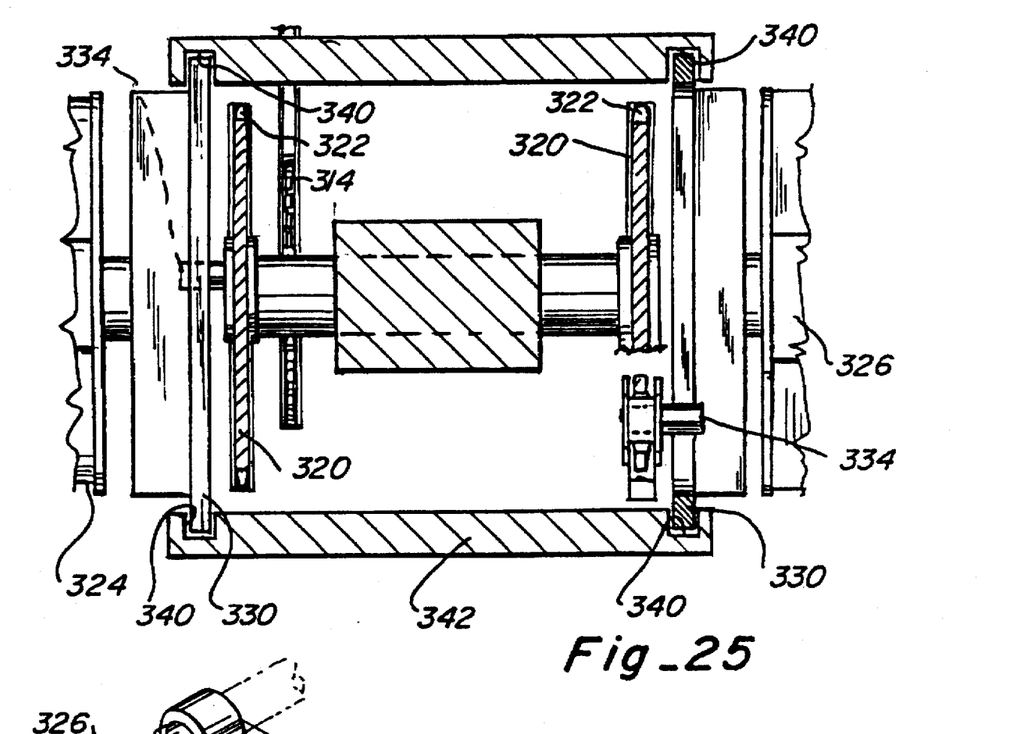
FIG. 25 is a cross-sectional view taken along lines 25—25 of FIG. 24.
Figure 26:
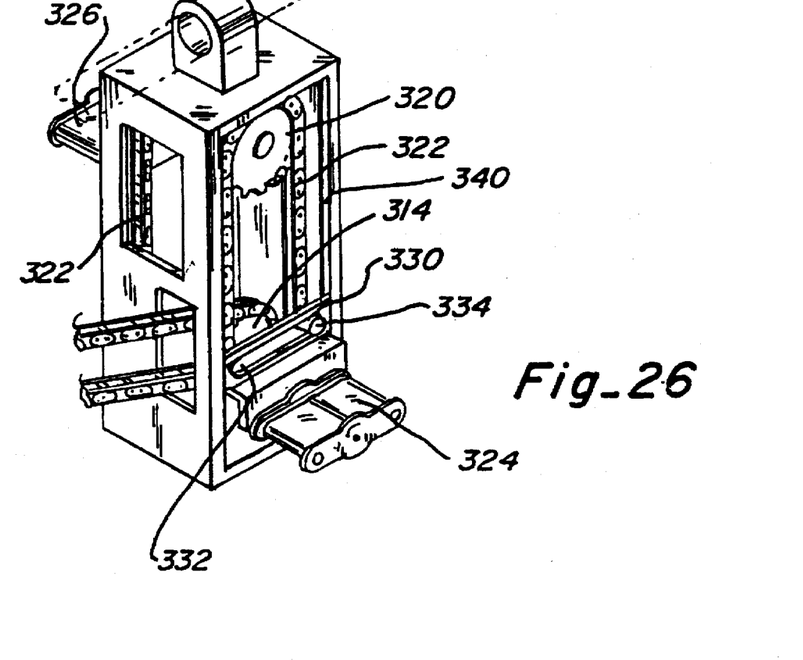
FIG. 26 is a perspective view of the drive apparatus of bicycle 300 illustrated in FIGS. 22 and 23.

In accordance with an important aspect of the present invention, each pedal 324, 326 is connected to an elongated slot defining chain engaging means or member 330 which drives its respective second drive chain 322 by engaging a drive pin 334 attached to the pivotal connection connecting two links of drive chain 322. As best illustrated in FIGS. 25 and 26, drive pin 334 extends outwardly from drive chain 322 a distance so that it extends through an elongated slot 332 defined by slot defining chain engaging means 330. Each slot defining chain engaging member is also rigidly attached to its respective pedal 324, 326 so that it is capable of driving its respective drive chain 322 via its respective drive pin 334 as the bicycle is pedaled with pedals 324, 326.

As best illustrated in FIG. 23, each slot has a length which is greater than or equal to the outside diameter of the larger of the third or fourth drive sprockets. In the illustrated embodiment, the third and fourth drive sprockets have the same diameter. Nonetheless, it is important that slot 332 have a width which is greater than either sprocket (if it is desired to use differently sized sprockets) so that drive pin 334 received in the slot can slide from one end 336 of the slot to its other end 338 and thereby rotate around the larger sprocket.

FIGS. 25 and 26 also illustrate that the right and left sides (not numbered) of each slot defining chain engaging member 330 are received within tracks 340 of the drive assembly's housing 342. Tracks 340 serve to maintain member 330's ends in alignment with the linear portions of the drive chain's path of travel. Track 340 is also preferably provided with bearing means (not shown) for reducing friction between the track and chain engaging member and for maintaining the generally horizontal position of the chain engaging member as downward and upward strokes are made with the pedal to which it is attached.

To propel the bicycle with the illustrated drive apparatus, one preferably begins by making a downstroke with either pedal 324 or 326. In a real world situation, one would begin making a downstroke with the pedal in a position near the top (or beginning) of its stroke which as illustrated in FIG. 26 would be pedal 326. As will be appreciated, when making the downstroke, drive pin 334 will be positioned against (or at least near) the forward end 336, (i.e. right end as depicted in FIG. 26) of slot 332. The power generated by the bicyclist making the downstroke will be transmitted from the pedal and attached slot defining chain engaging member 330 to drive pin 334 which in turn will drive the second drive chain 322. At the end of a downstroke, the drive pin will slide in slot 332 away from its forward end 336 to its rearward end 338, as it follows the arc made by the drive chain as it travels across third sprocket 318. When the bicyclist makes a power generating downstroke with the other pedal, drive pin 334 will carry the slot defining chain engaging member and attached pedal to its top position so that the bicyclist can begin making another power generating downstroke.

It will be appreciated that the right and left pedals cooperate in this manner to return each pedal to its top position by being positioned one-half of a cycle out of phase with each other. (See FIG. 24) As such, when the right pedal reaches its lowermost position at the end of a downstroke, the left pedal will be at its uppermost position and in position to begin making a power generating downstroke therewith. (It will also be appreciated that the respective chain engaging members 330 and drive pins received thereby are similarly out of phase with each other.)

While it is generally anticipated that most bicyclists will only drive the apparatus by making power generating downstrokes, those skilled in the art will appreciate that it is possible to generate additional power by driving the bicycle with an upstroke as well. This is easily accomplished with the drive apparatus of the present invention by simply securing the bicyclist's foot to the pedal in some manner. It is anticipated that professional bicycle racers will utilize the drive apparatus in this manner which readily lends itself to such use due to its linear nature.

While the general operation of the drive apparatus for driving bicycle 300 has been described, it is important to also note that the slot defining chain engaging member must move linearly (i.e. in a straight line located between the centers of the third and fourth sprockets) a distance equal to the lengthwise diameter of the drive chain's path of travel. If the chain engaging member, (and for that matter the pedal to which it is attached) does not move this required distance, drive pin 334 will not be able to slide in slot 332 from its forward end 336 to its rearward end 338, or vice versa. Thus, the drive chain will not be able to make a complete revolution, or for that matter, even one-half of a revolution. It is also important that the chain engaging member not move a distance greater than the lengthwise diameter of the drive chain's path of travel. If it could, it could pull the drive chain off sprockets 318, 320. Such excessive movement is prevented in the illustrated embodiment, by the top and bottom portions of housing 342. While such limited movement may appear to be a problem, those skilled in the relevant art will appreciate that the drive apparatus can be easily adjusted to accommodate bicyclist who make long (or short) strokes because the distance between the third and fourth sprockets can be easily adjusted. While no means for adjusting this distance is not shown or described, those skilled in the mechanical arts will have no difficulty devising such a device. Of course, if the distance between the third and fourth sprockets is changed, the length of the drive chain will have to be changed accordingly.

Figures 27, 28:
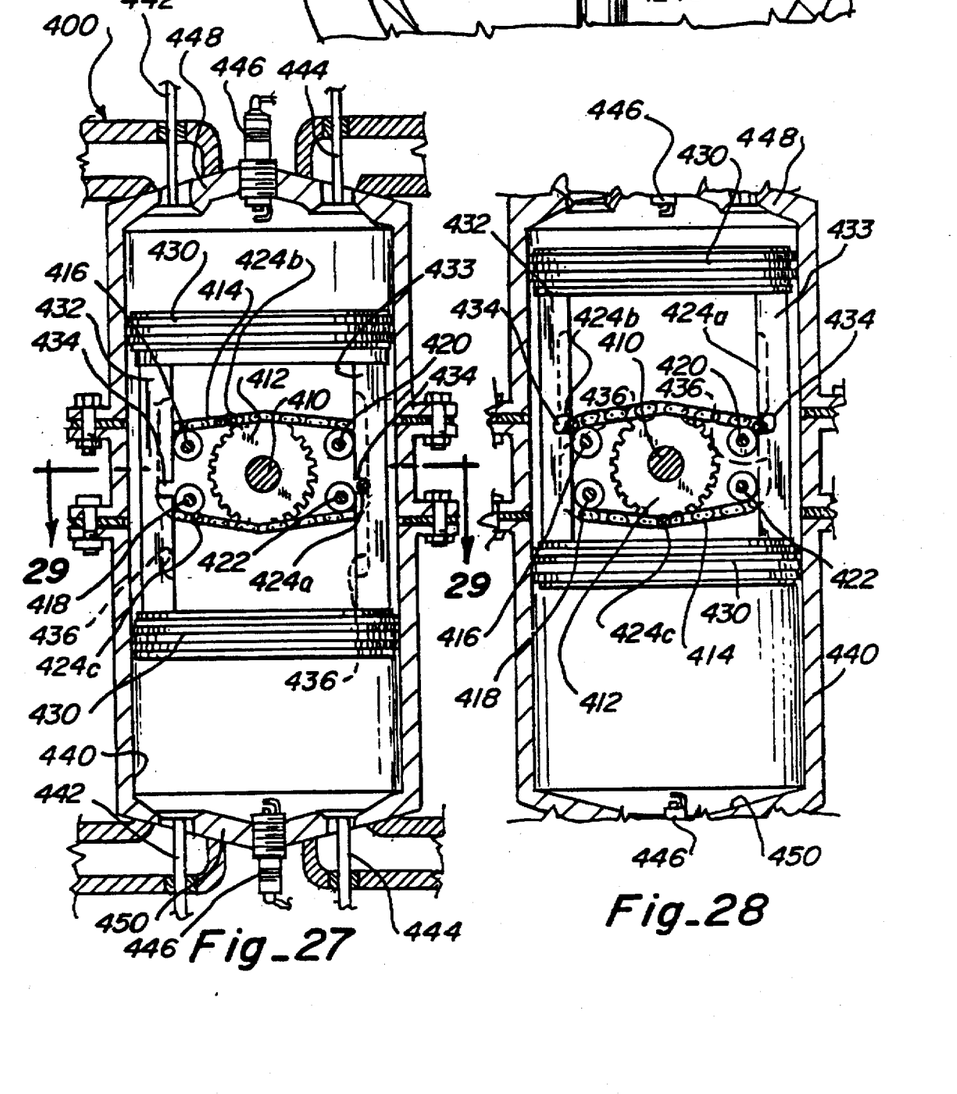
FIG. 27 is a side cross-sectional view of another embodiment of the present invention for driving the drive shaft of a motor vehicle.
FIG. 28 is a cross-sectional view similar to that of FIG. 27 showing, however, the dual-headed piston arrangement of this embodiment at the end of its upstroke.
Figure 29:
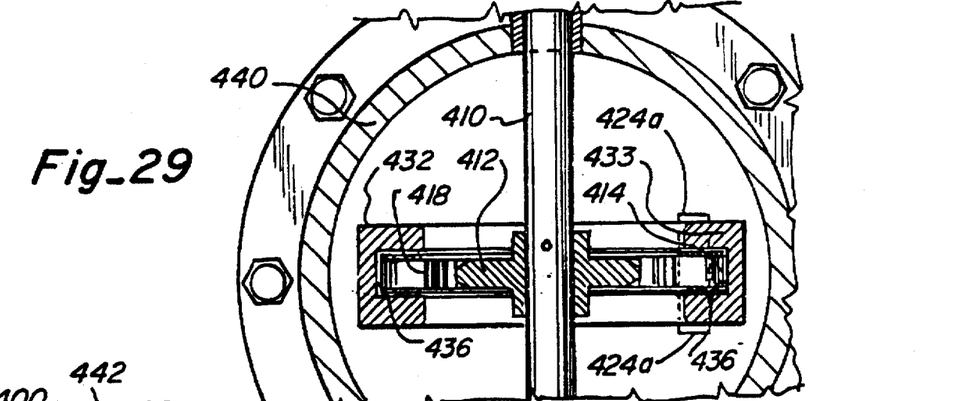
FIG. 29 is a cross-sectional view taken along lines 29—29 of FIG. 27.

FIGS. 27 through 29 illustrate a drive apparatus 400 of the present invention for driving the drive shaft 410 of a motor vehicle. As with the other embodiments, this apparatus transmits or converts power generated linearly, i.e. in this case, power generated by a stroke of a piston head into rotary power for purposes of rotating drive shaft 410.

As illustrated, drive shaft 410 is attached to a sprocket 412 which is axially aligned with drive shaft 410. Sprocket 412 is driven by a drive chain 414 which is slung about four pulleys which are identified herein as first pair of pulleys 416, 418 and second pair of pulleys 420, 422. While pulleys are illustrated, guide sprockets could also be utilized.

As those skilled in the art will appreciate, to engage and drive sprocket 412, the distance between the centers of each pair of pulleys 416, 418 and 420, 422 must be less than the diameter of sprocket 412. Thus, the diameters of each pulley must be less than one-half the diameter of sprocket 412. In addition, sprocket 412 must be located and centered between the two pairs of pulleys as illustrated. Moreover, straight lines drawn through the centers of each pair of pulleys should also be parallel to each other for reasons which will become apparent from the following description.

Returning now to previously mentioned drive chain 414, it can be seen in FIGS. 27 and 28 that drive chain 414 is provided with three drive pins 424(a), (b) and (c) which are spaced equally from each other, i.e. the distances between each drive pin as measured along the chain are equal. FIG. 29 illustrates that the drive pins project outwardly a certain distance from both sides of drive chain 414.

FIGS. 27 and 28 also illustrate drive apparatus 400 is provided with a pair of axially aligned piston heads 430 which are connected by opposing connecting rods 432, 433.

In accordance with an important aspect of this embodiment of the invention, each opposing connecting rod 432, 433 defines an opposing notch 434 and groove 436. As illustrated in FIG. 29, each notch 434 extends across the entire width of each connecting rod 432, 433. Each notch is also sized and configured to receive drive pins 424 attached to drive chain 414. Each drive pin also has a length which is slightly greater than the width of the connecting rod so that the opposing ends of each drive pin project slightly out from the sides of each connecting rod. In addition, each groove defined by the connecting rod is sized and configured to receive drive chain 414 so that the drive chain can travel through the groove. It is also important as illustrated in FIG. 28 that each groove communicate (i.e. open into) its respective notch 434 and extend along the length of the connecting rod a distance which is at least equal to the length of the piston's stroke. The importance of this will be appreciated shortly and is described in more detail below. In addition, a factor which should be considered in the design of a drive apparatus 410 is the length of the pistons' stroke which will always be equal to one-half the distance between two drive pins.

Returning to the Figures, it will be seen that the connected pair of piston heads 430 and previously described drive assembly components are housed within a cylindrical chamber 440. The chamber is similar to that found in most internal combustion engines with the exception that the cylinder is provided with intake and exhaust ports 442, 444 respectively, and spark plugs 446 at both of its ends 448 and 450. Accordingly, it will be appreciated that the connected pair of piston heads 430 can be driven in a reciprocating manner by properly timing the firing of the spark plugs located in ends 448 and 450 of the chamber. The timing and firing of the spark plugs can be done in any conventional manner known to those skilled in the relevant art.

The operation of apparatus 400 to drive chain 414 which in turn drives drive shaft 410 is as follows. FIG. 27 illustrates the connected pair of piston heads 430 making an upstroke wherein drive pin 424(a) is received within the notch 434 of connecting rod 433. As will be appreciated, connecting rod 433 carries drive pin 424(a) upwardly (thereby driving chain 414) until the end of the upstroke is reached, the end of which is illustrated in FIG. 28. At this point, it will be appreciated that drive pin 424(a) is in the process of exiting notch 434 of connecting rod 433. As this is happening, however, it will also be appreciated that drive pin 424(b) is entering notch 434 of connecting rod 432 to continue driving chain 414. When piston heads 430 begin to make their downstroke, i.e. when spark plug 446 located in end 448 is fired, drive pin 424(b) will be completely received within notch 434 of connecting rod 432 and will thereby be in position to continue driving chain 414 in a counter-clockwise direction. When piston heads 430 complete their downstroke, drive pin 424(b) will exit the lower end of groove 436 of connecting rod 432. At this point, drive pin 434(c) will enter notch 434 of connecting rod 433 which will carry it upwardly as previously described during the piston heads upstroke as illustrated in FIG. 27. In view of the above, it will be appreciated that chain 414 will be driven continuously which in turn will drive sprocket 412 continuously and, as such, rotate drive shaft 410 continuously.

As with the other embodiments, those skilled in the art will appreciate that the present invention converts substantially all of the linear power generated by the linear movement of the piston heads to rotary motion, thereby providing a system which is much more efficient than that provided by conventional drive apparatus for driving a vehicle's drive shaft. Those skilled in the fuels art will also appreciate that unlike conventional gasoline engines using conventional piston technology which require relatively high octane fuel, the duel headed piston apparatus of the present invention can operate quite efficiently on lower octane fuels.

The invention has been described in detail with reference to particular embodiments thereof, but it will be understood that various other modifications can be effected within the spirit and scope of this invention.

What is claimed:

1. An apparatus for continuously transmitting energy to or from an axle, shaft and the like, said apparatus comprising:

first sprocket/pulley means axially aligned with and connected to an axle;

flexible ratch means for engaging said sprocket/pulley means; and cooperating first and second energy transmitting ratch engaging means for releasably engaging said flexible ratch means to continuously drive said sprocket/pulley means which, in turn, continuously drives the axle when energy is transmitted by said first and second ratch engaging means to said flexible ratch means.

2. An apparatus as claimed in claim 1 further comprising:
handle/pedal means attached to said cooperating first and second ratch energy transmitting engaging means for powering by an individual to enable an individual to drive said first sprocket/pulley means which, in turn, drives said axle.

3. An apparatus as claimed in claim 1 wherein said flexible ratch means includes a member selected from the group of flexible chain, flexible belt and flexible cable.

4. An apparatus as claimed in claim 1 wherein said flexible ratch means is slung about said first sprocket/pulley means and a second sprocket/pulley means, and wherein said first ratch engaging means engages said flexible ratch means when said first ratch engaging means is moved in a first linear direction between said first and second sprocket/pulley means and wherein it releases said flexible ratch means when it is moved in a second linear direction opposing the first direction, said second ratch engaging means engaging said flexible ratch means when said second ratch engaging means is moved in the second direction and releasing said flexible ratch means when it is moved in the first direction, said first and second ratch engaging means cooperating so that one of said first and second ratch engaging means engages said flexible ratch means as the other of said first and second ratch engaging means releases said flexible ratch means.

5. An apparatus as claimed in claim 4 further comprising a wheelchair having a pair of propulsion wheels driven by a pair of said axles.

6. An apparatus as claimed in claim 4 further comprising a bicycle having a wheel driven by said axle.

7. An apparatus as claimed in claim 1 further comprising:
piston means attached to said cooperating first and second energy transmitting ratch engaging means for receiving and transmitting energy to enable said cooperating first and second energy transmitting ratch engaging means to releasably engage said flexible ratch means to continuously drive said sprocket/pulley means which, in turn, continuously drives the axle.

8. An apparatus as claimed in claim 7 wherein said piston means is housed within a cylindrical chamber of an internal combustion engine for permitting reciprocal motion of said piston means within said cylindrical chamber.

9. An apparatus as claimed in claim 8 wherein said axle is connected to a motor which drives said axle which in turn rotates said sprocket/pulley means to drive said flexible ratch means which in turn is releasably engaged by said cooperating first and second ratch engaging energy transmitting means which transmits energy from said motor to said piston means to pump fluid through said cylinderical chamber.

10. An apparatus as claimed in claim 8 wherein said piston means includes a pair of axially aligned piston heads connected by opposing connecting rods, said opposing connecting rods defining said cooperating first and second energy transmitting ratch engaging means.

11. An apparatus as claimed in claim 1 further comprising a pair of axially aligned piston heads connected by opposing connecting rods wherein said connected pair of axially aligned piston heads is housed within a cylindrical chamber permitting reciprocating motion of the axially aligned pair of piston heads when the piston heads are reciprocally driven by controlled explosions of fuel occurring in the chamber between the ends of the cylindrical chamber and the piston heads and wherein said flexible ratch means includes an endless drive chain slung about first and second pairs of second sprocket/pulley means, all of which have a diameter which is less than half the diameter of said first sprocket/pulley means, the centers of said first pair of second sprocket/pulley means being located a distance apart from one another which is less than the diameter of said first sprocket/pulley means, the centers of said second pair of second sprocket/pulley means also being located a distance apart from one another which is less than the diameter of said first sprocket/pulley means, said first and second pairs of second sprocket/pulley means further being oriented so that a straight line drawn between the centers of the first pair is parallel to a straight line drawn between the centers of the second pair, said first sprocket/pulley means further being centered between said first and second pairs of said second sprocket pulley means such that said first sprocket/pulley means is engaged by said drive chain on opposite sides thereof, and wherein said drive chain means includes three equidistant drive pin means extending outwardly from a link of said drive chain for cooperating with said chain engaging means to transmit force to said drive chain to drive said chain in one direction, and wherein said cooperating first and second ratch engaging energy transmitting means include opposing groove/notch means defined by said opposing pair of connecting rods for receiving said drive, chain and drive pin means wherein said notch is sized and configured to receive said drive pin means and said groove is sized and configured to receive said drive chain for movement therethrough, said drive pin means being positioned on said drive chain and cooperating with said opposing notches of said connecting rods so that one of said drive pin means is received by one of said opposing notches as the immediately following drive pin means exits the opposing notch means at the end/beginning of each power stroke made by said connected pair of piston heads.

12. A method for continuously driving an axle, shaft and the like, said method comprising the steps of:
providing an apparatus including:
first sprocket/pulley means axially aligned with and connected to an axle;
flexible ratch means for engaging and driving said first sprocket/pulley means;
cooperating first and second ratch engaging means for releasably engaging the flexible ratch means to continuously drive the sprocket pulley means which, in turn, continuously drives the axle;
moving the first and second ratch engaging means in the direction of the linear paths of the flexible ratch means so that the first ratch engaging means engages and drives the flexible ratch means which rotates the sprocket/pulley means which, in turn, drives the axle; and
reversing the first ratch engaging means' direction of movement so that the first ratch engaging means releases the flexible ratch means as the second ratch engaging means engages the flexible ratch means to continuously rotate the sprocket/pulley means which, in turn, continuously drives the axle.

* * * * *